United States Patent [19]
Ashikian

[11] 3,746,331
[45] July 17, 1973

[54] ANNULAR SPRINGS

[76] Inventor: Baroir Ashikian, B-Ashikian 505 Trechelle, Sherbrooke, Quebec, Canada

[22] Filed: Aug. 30, 1971

[21] Appl. No.: 176,079

[52] U.S. Cl. .................................. 267/182, 152/74
[51] Int. Cl. ............................................. F16f 1/18
[58] Field of Search ..................... 267/182; 152/20, 152/69, 74, 75, 86

[56] References Cited
UNITED STATES PATENTS

| | | | |
|---|---|---|---|
| 488,539 | 12/1892 | Claus | 152/74 |
| 607,518 | 7/1898 | Meyer | 152/69 |
| 1,042,214 | 10/1912 | Grace | 152/69 |
| 1,389,285 | 8/1921 | Althoff | 152/20 |
| 2,639,752 | 5/1953 | Schehr | 152/74 |

*Primary Examiner*—James B. Marbert

[57] ABSTRACT

An annular web made of spring alloy and having a suitable cross section provides a radial elastic support between a part contacting web's inner periphery and another contacting web's outer periphery.

4 Claims, 6 Drawing Figures

PATENTED JUL 17 1973 3,746,331

ANNULAR SPRINGS

This invention pertains to devices providing a radial elastic support between a part and another surrounding it between an axle and a road or track.

When presently confronted with the need for a radial elastic support between a circular part and another surrounding it, in conditions excluding the use of elastomers, the designer has to use a number of suitable springs located in the annuar spaced between the aforementioned parts. The resulting arrangement involves too many parts, requires close tolerances in order to obtain a uniform elastic support and it is therefore quite expensive.

My invention is intended to provide a simple inexpensive solution to the problem of assuring, even in severe environmental conditions, a continuous elastic support between a part and a second surounding the first but not necessarily concentric to it.

The invention consists of a thin annular web of spring alloy having a suitable cross section enabling it to deflect when subjected to a radial loading between a part located in the centered or off-centered hole within the web and a part contacting the web's outer diameter.

Further features of my invention will be apparent from the following description and appended claims, referring to the accompanying drawings, which show by way of a few examples some of the more common embodiments of my invention.

With reference to the drawings, 1 is an outer cylindrical flange, 2 is an inner cylindrical flange concentric to 1, 3 is a web of suitable cross section joining the two flanges with convenable corner radii and 4 is a central hole surrounded by flange 2.

The choice of cross section is dictated by the kind of application for which the annular spring is intended. Flangeless webs having simple cross sections in an arc of circle are more economical to make and should be used whenever possible. On the other hand, it is advisable to use flanged webs, such as illustrated in the accompanying figures, when large loads are to be transmitted directly to the annular spring.

Figure 1:
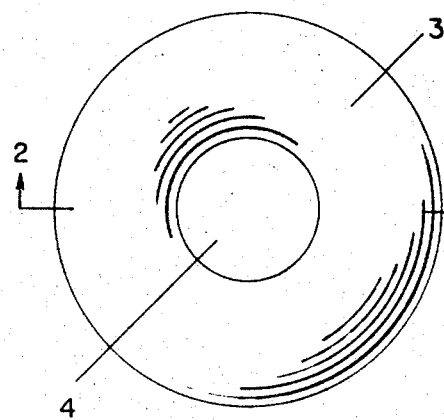
FIG. 1 is a front view of an annular spring.
Figure 5:
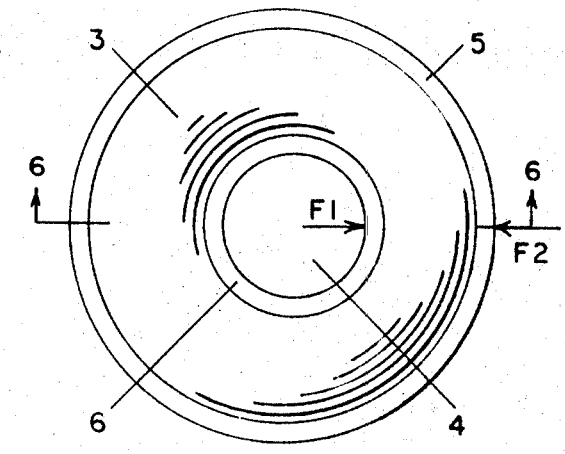
FIG. 5 is a front view of an annular spring loaded between two rings rigidly secued to the spring flanges.
Figure 2:
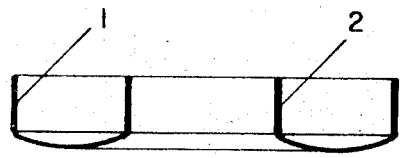
FIG. 2 is a transverse sectional view on line 2—2 of FIG. 1.
Figure 6:
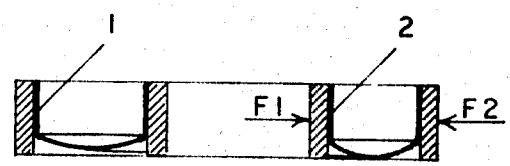
FIG. 6 is a transverse sectional view on line 6—6 of FIG. 5.
Figure 3:
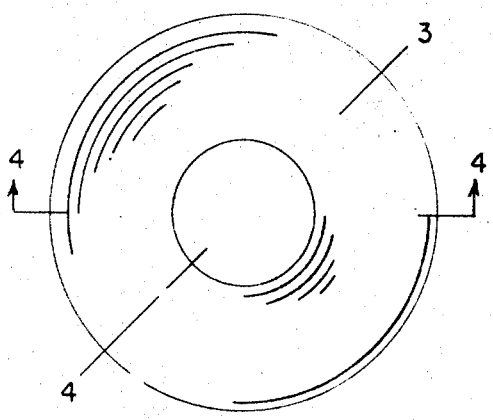
FIG. 3 is a front view of a second annular spring.
Figure 4:
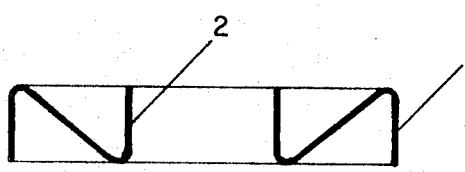
FIG. 4 is a transverse sectional view on line 4—4 of FIG. 3.

The radial load deflection characteristics of an annular spring depend on the shape and dimensions of its cross section and on the physical properties of the spring material after its final heat treatment. The arrows in FIGS. 5 and 6 indicate a pair of concentrated opposing forces applied to an annuar spring fastened to an outer collar 5 and an inner collar 6. The web's deflection diminishes gradually and symmetrically on either sides of load's application radius.

In applications involving repeated cyclic loading, the operating stresses should be under those allowed for the desied number of cycles, the spring's surface finish must be of high quality, and the corner radii well chosen.

The annular springs could be coated with appropriate protective material against any particular chemical action or even made of suitable spring material having such resistance.

Individual annular springs or radial elastic support assemblies could be used to provide radial preloading or elastic support between two components such as an axle and a road or track, a shaft and its surrounding housing and so on.

For some special applications, the annular springs could have features departing significantly from the aforementioned description and the accompanying drawings, without departing however from the spirit of the appended claims. Some of these non standard features are: off centered hole, no flanges at 11, thicker flanges than the web, flanges of different widths.

I claim:

1. A circumferentially uniform annular spring formed from a thin sheet of spring steel and consisting of an annular web and of two concentric cylindrical flanges extending from the said web and joining it with generous corner radii, said flanges serving to locate the annular spring between an inner and an outer load carrying elements, said web deforming radially and circumferentially under the action of radially opposed loads applied to its said flanges, and said web and flanges having surfaces with a finish of high quality.

2. An annular spring as claime in claim 1, wherein a radial cross section through the web and the two concentric flanges has the approximate shape of "U" letter.

3. An annular spring as claimed in claim 1, wherein a radial cross section through the web and the two concentric flanges has the approximate shape of a "Z" letter.

4. An annular spring as claimed in claim, wherein the web and the flanges are coated with a protective material suited for the intended application.

* * * * *